June 16, 1959     J. J. VANIER ET AL     2,890,803
APPARATUS FOR STORING FLOUR

Filed Nov. 9, 1954     6 Sheets-Sheet 1

INVENTORS
JOHN J. VANIER
JOHN T. LANDES
BY
Attorney

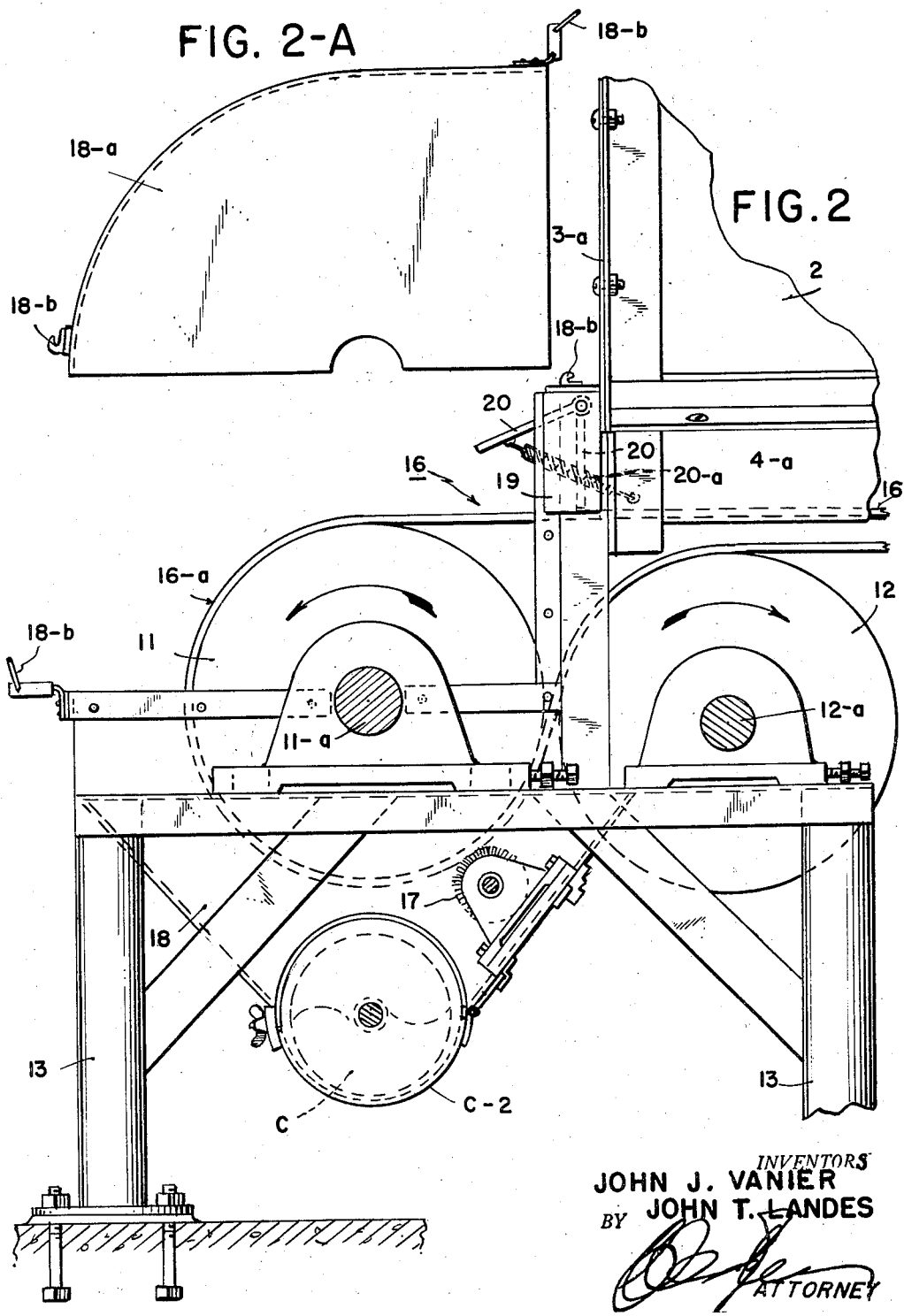

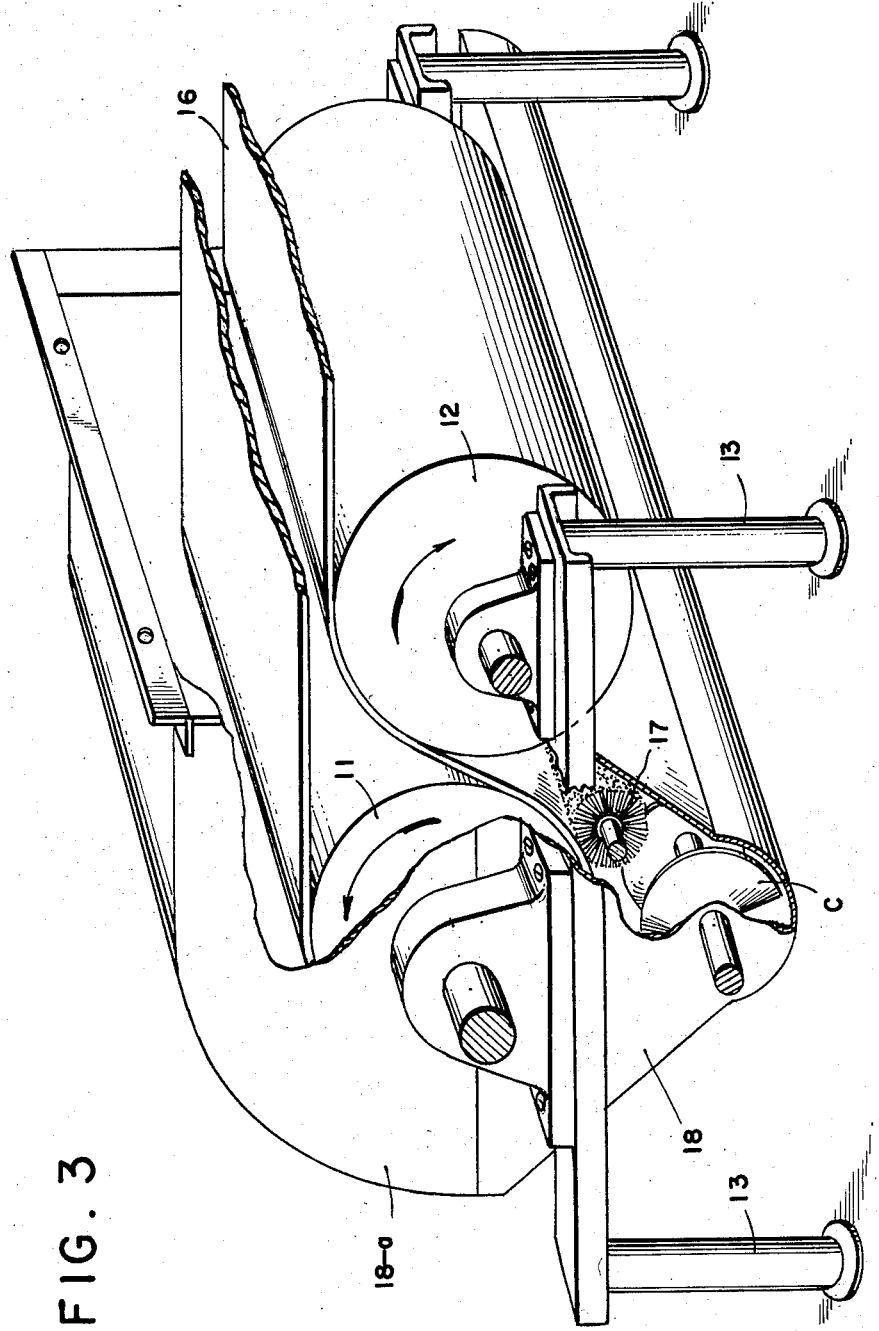

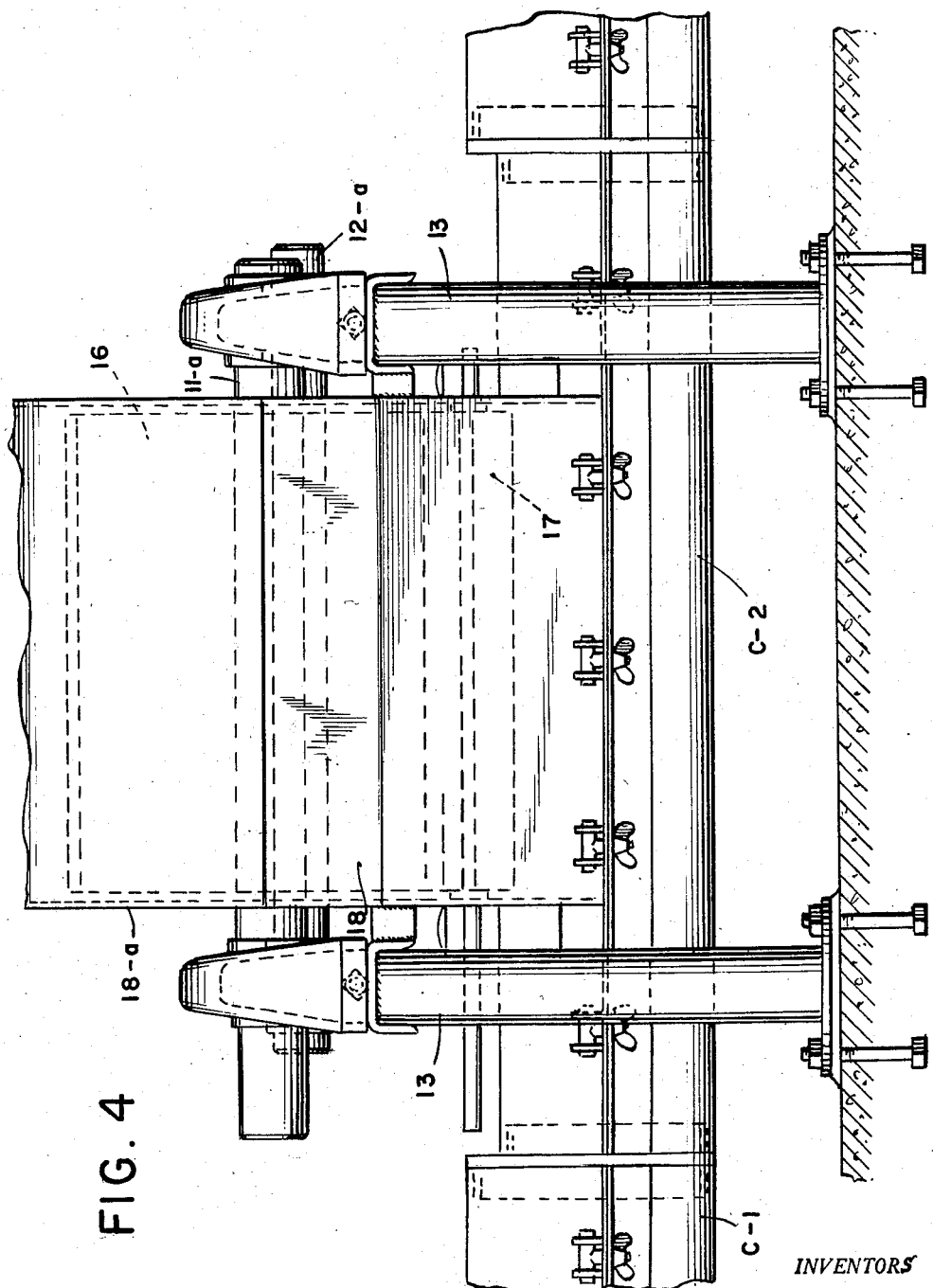

June 16, 1959  J. J. VANIER ET AL  2,890,803
APPARATUS FOR STORING FLOUR
Filed Nov. 9, 1954  6 Sheets-Sheet 5
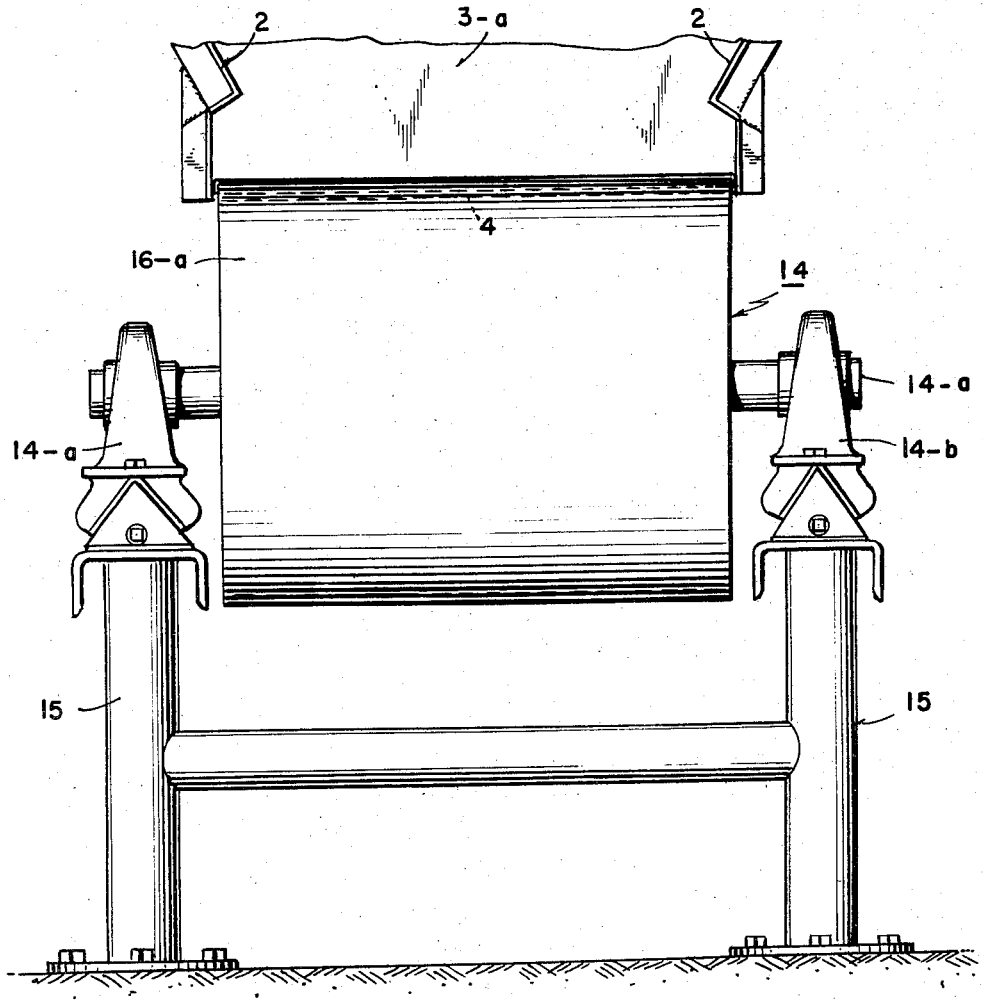
FIG. 5
INVENTORS
JOHN J. VANIER
JOHN T. LANDES
BY
Attorney June 16, 1959 J. J. VANIER ET AL 2,890,803
APPARATUS FOR STORING FLOUR
Filed Nov. 9, 1954 6 Sheets-Sheet 6
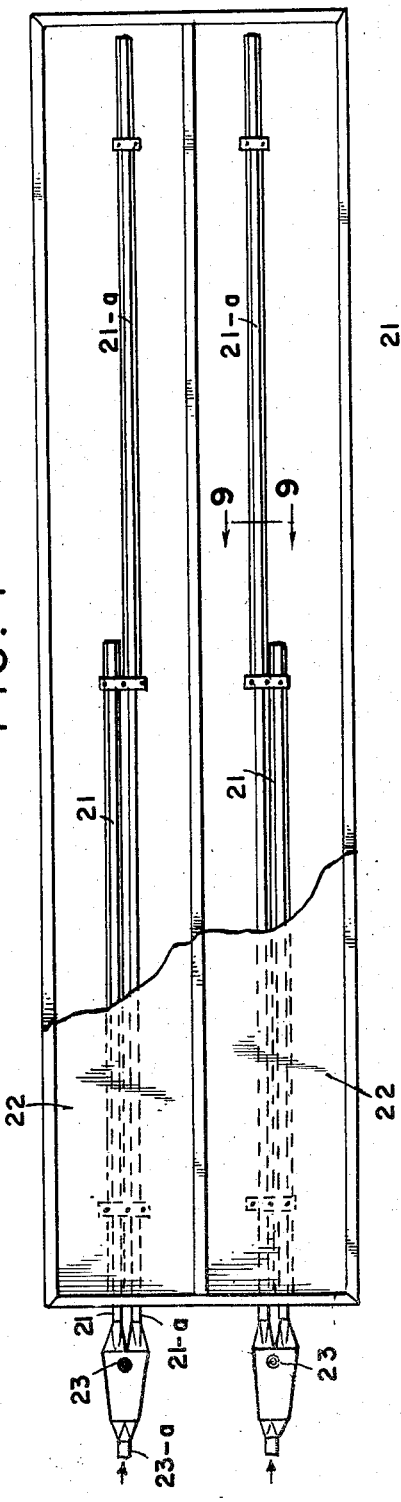
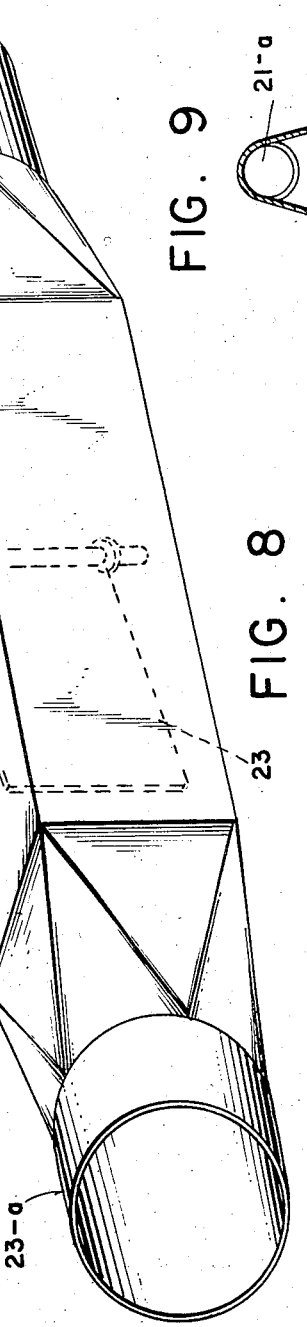
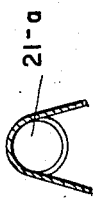
INVENTORS
JOHN J. VANIER
JOHN T. LANDES
BY
Attorney United States Patent Office 2,890,803
Patented June 16, 1959

2,890,803

APPARATUS FOR STORING FLOUR

John J. Vanier and John T. Landes, Salina, Kans.

Application November 9, 1954, Serial No. 467,751

1 Claim. (Cl. 214—17)

Our invention consists in a new and useful improvement in apparatus for storing flour having means for charging storage bins and conveying the flour from the bins. The apparatus has been developed for providing bakeries with adequate and efficient bulk flour storage means. At the present time, most bakeries receive their flour in one hundred pound sacks. These sacks are dumped into a bin, elevated and conveyed to the work area. The emptying and dusting of sacks are performed manually. By the use of our apparatus, bulk flour can be delivered to a bakery, and by means of air pressure the flour is charged into a storage bin. From this bin the flour is discharged, as needed, by means of a belt conveyor to the conventional screw conveyor of the bakery, rapidly and efficiently. There are no more sacks to dump, and the possibility of foreign matter being introduced into the flour, while dumping, is eliminated. The manpower required for dumping can be devoted to other uses and an ample supply of flour is at all times ready for use. Bulk flour, as handled by our apparatus, has the additional advantage of being of uniform moisture and temperature. There are additional savings in the fact that flour sacks need no longer be purchased by the bakery.

Our improved apparatus presents a novel and entirely different solution to the problem of bulk flour storage. It is designed to provide dust-tight storage and has means for discharging the stored flour rapidly and efficiently when it is needed. Our improved storage bin is fabricated with interlocking panels designed to fit in such a manner that a dust-tight seal is effected without the use of gaskets. The slope and size of the hopper section of the bin has been designed to achieve rapid and efficient discharge, preventing bridging of flour in the bin.

The flour is delivered into the bin under air pressure, through a flour loading tube which is specially designed. As flour is required for bakery mixes, a suitable motor drive for the conveyor is energized from a suitable panel board, and the belt conveyor unloads the bin at a determined rate by producing a continuous ribbon of discharged flour having a determined depth. The belt conveyor used in our apparatus effects a novel and successful method of bin unloading. Our bin design eliminates all need for any sort of vibrator, and the bin can be completely emptied without having flour adhere to any part of the bin.

Our improved apparatus comprises the bin, the belt conveyor, a belt seal, and the flour loading tube. Each of these elements is a separate, novel and useful improvement, and their combination has produced a novel and useful advance in the art of transportation, storage and handling of bakery flour.

While we illustrate in the drawings and hereinafter fully describe one specific embodiment of our invention, it is to be distinctly understood that we do not consider our invention to be limited to said specific embodiment, but refer for its scope to the claim appended hereto.

In the drawings:

Fig. 2 is a side elevation of the head assembly of the conveyor.

Fig. 2-a is a side elevation of the removable cover for the casing of the head assembly.

Fig. 3 is a perspective of the head assembly mechanism.

Fig. 4 is a front elevation of the head assembly.

Fig. 5 is a rear elevation of the tail assembly of the conveyor.

Figure 6:
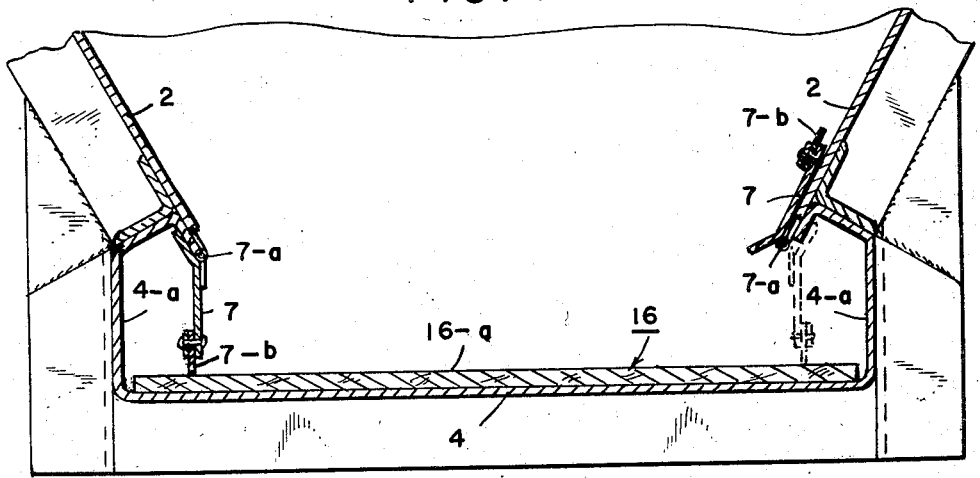

Fig. 6 is a fragmentary, transverse, vertical section of one of the bins and the conveyor.

Fig. 7 is a top plan of the two bins, the covers being broken away to show the loading tubes.

Fig. 8 is an enlarged, fragmentary perspective of the loading tubes.

Fig. 9 is an enlarged section on line 9—9 of Fig. 7.

Figure 1:
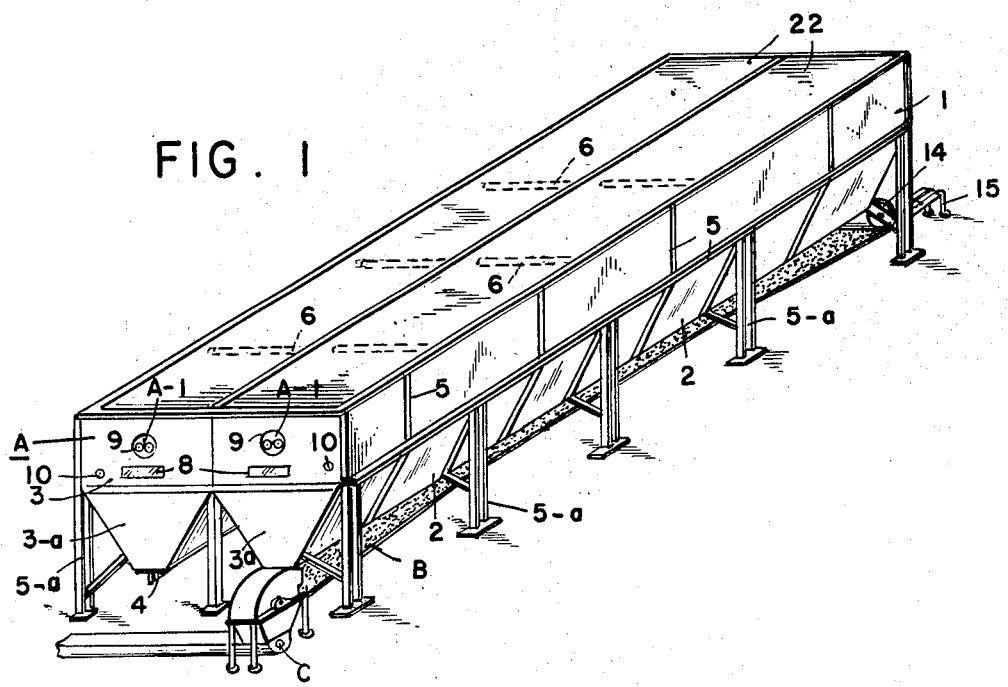
Fig. 1 is a perspective of two of our improved bins.

As shown in the drawings, our improved apparatus comprises two bins A, with loading tubes A–1, and a belt conveyor B associated with a conventional screw conveyor C (Fig. 1).

Each bin A is constructed of panels comprising side sections 1, hopper sections 2, front and rear end sections 3 and 3–a, and a feeder bed 4. The panels are made of sheets secured to supporting frame members 5 carried by suitable supports 5–a. The frame members 5 are drilled to match and are secured together on the inside of the bin A. The panels 1 and 2 are so constructed that they extend beyond the frame members 5 on two sides, so that the frame members 5 are secured together, the sheets overlapping the joint between the frame members and seal the joint. The panels 1 on opposite sides of the bin A are tied together by spacer rods 6 which extend through the bin A to prevent bulging.

The feeder bed 4 is constructed of a single sheet extending the entire length of the bin A. It has upstanding lateral flanges 4–a atached to the bottom edges of the hopper sections 2 (Fig. 6). The width of the feeder bed 4 and the inward slope of the hopper sections 2 are designed to a definite proportion to the cross-sectional area of the bin A. A pair of belt seals 7 are hinged to the flanges 4–a of the feeder bed 4, on each side and extend the length of the bed. Each belt seal 7 is formed to fit against the inside of the flange 4–a of the feeder bed 4 and extend down vertically to the belt when the belt seal 7 is in its normal position. The hinge 7–a is attached to the flange 4–a and to the belt seal 7. The belt seal 7 therefore can be lifted back, against the hopper section 2, and the entire belt area can be cleaned. To the lower edge of the belt seal 7 a strip of pure gum rubber 7–b is attached to rest against the belt, making a dust tight seal with the belt. As the belt moves the length of the bin A, the belt seal 7 resting on each edge of the belt acts as a retainer, to keep flour from moving to the edges of the belt.

The end panels 3 connect the side panels 1, and the end panels 3–a connect the hopper panels 2. Both end panels 3 have transparent inspection plates 8. A flour delivery tube inlet 9 and a suction outlet 10 are disposed in the panel 3 at the delivery end of the bin A. One of the end panels 3–a has a manhole plate (not shown) which is bolted to the panel 3–a and may be removed for inspection.

We will now describe our improved belt conveyor B (Figs. 2, 3, 4, 5 and 6).

The head assembly of the conveyor B, at the delivery end of the bin A, comprises a drive pulley 11 and a snub pulley 12 (Figs. 2 and 3) on shafts 11–a and 12–a, respectively, suitably journaled on a supporting frame 13 adjacent the delivery end of the bin A. The drive pulley 11 has any suitable driving means (not shown).

The tail assembly of the conveyor B, at the rear end of the bin A, comprises a pulley 14 suitably journaled in a supporting frame 15 adjacent the rear end of the bin A (Fig. 5). The shaft 14–a of the pulley 14 is carried in bearings 14–b which are slidable on frame 15 and provided with suitable belt tightening means (not shown). A belt 16 is rove about pulleys 11 and 14 and over pulley 12, its upper run being supported on the feed bed 4 (Fig. 6) and its lower run passing below the bed 4 and outside of the bin A. The upper run of the belt 16 forms the actual floor of the bin A, sliding on the feeder bed 4. When the bin A is charged, the flour rests directly on the belt 16. The belt is flat, made of nylon and cord, impregnated with rubber and covered by a layer of neoprene. The width of the belt is 1/4 of an inch less than the width of the feeder bed 4 and the belt is so aligned as to allow 1/8 of an inch clearance on each edge.

The pulley 11 turns counter-clockwise and the pulley 12 turns clockwise, as viewed in Figs. 2 and 3.

A cylindrical brush 17 is journaled in the frame 13 below the drive pulley 11 and comprises a circular right and left spiral nylon brush the length of which is equal to the width of the belt 16. This brush 17 is driven in the same direction as the drive pulley 11 against the upper face 16–a of the belt 16. The brush 17 is geared to the driving means so that it rotates at five times the speed of the belt 16, cleans the belt 16 of any flour that remains on the face 16–a.

The head assembly is provided with a suitable casing 18 mounted on the frame 13 and housing pulleys 11 and 12 and brush 17. Suitably disposed below the lower end of the casing 18 is the screw conveyor C, its longitudinal axis lying in the vertical plane passing through the axis of the shaft 11–a of the pulley 11 (Fig. 2). A cover C–1 of the conveyor C has a portion C–2 which is connected to the bottom of the casing 18 (Figs. 2 and 4). A removable cover 18–a (Fig. 2–a) is provided for the casing 18 and has trunk-latches 18–b for fastening it in closed position.

The end panel 3–a, at the discharge end of the bin A, has its lower edge spaced above the feeder bed 4 (Fig. 2). Suitably mounted on the lower end of this end panel 3–a, there is a bracket 19 in which is pivoted an adjustable valve plate 20 (Fig. 2). It is biased by a spring 20–a to closed position (dotted lines) and normally rests upon the belt 16, thus closing the discharge end of the bin A. It is obvious that the degree to which the plate 20 is moved from its normal position determines the thickness of the layer of flour which the belt 16 carries out of the bin A. Means (not shown) are provided for setting the plate 20 in desired open positions.

The end panel 3–a, at the rear end of the bin A (Fig. 5), has its lower edge spaced above the feeder bed 4 a sufficient distance to allow the upper run of the belt 16, passing off of the pulley 14, to enter the bin A. A suitable end seal (not shown) is mounted on the lower edge of this end panel 3–a and bears on the face 16–a of the belt 16.

We will now describe our improved loading tubes A–1 for charging the bins A with the flour.

Each loading tube 21 is designed to fill twenty running feet of bin A. The wall of a seamless feed tube is cut for a distance of twenty feet. The portions of the tube, 90° on either side of the cut are bent downwardly and flattened, so that a U-shaped cross-section is formed. The tube 21 is attached to the under-side of the cover 22 of the bin A. Flour under air pressure is delivered to the bin A by a seamless feed tube (not shown) through the inlet 9 and connected to the loading tube 21. The velocity of the flour as it enters the U-shaped portion of the tube 21 is sufficient to carry it to the end of the tube 21. The U-shaped portion of the tube 21 acts to contain and control the flour particles so that they travel twenty feet in suspension. The twenty feet of the bin A, in which the U-shaped portion is mounted is thus entirely filled with flour.

If the bin A is more than twenty feet in length, the remaining length of the bin A over the original twenty feet is filled by means of an additional tube 21–a installed in the bin A. In the event of the use of more than one tube, a valve 23 is installed in the flour delivery line 23–a and flour may be directed into the proper flour loading tube 21 or 21–a, as different portions of the bin A become filled.

The air entering the bin A with the flour is removed through the suction outlet 10 located at the delivery end of the bin A. The suction outlet 10 is connected by a return line (not shown) to the suction side of the blower. Any flour that might pass the suction outlet 10 is trapped in the return line.

Having described our invention, what we claim is:

In a bin for storage of flour, the combination of a smooth-surface bottom wall extending longitudinally of the entire bin; a conveyor belt having smooth upper and lower surfaces and adapted to be moved longitudinally through the bin, its bottom surface sliding on said bottom wall of the bin; and a pair of belt seals extending longitudinally the entire length of the bin, and having rectilinear, resilient lower edges, said seals being so hinged to the inner faces of the lower sides of the bin, respectively, as to be adapted to be swung downwardly so that said edges bear upon said belt in constant sealing engagement with said smooth upper surface of said belt when said belt is in operation, to prevent passage of the flour laterally from said belt, and to be swung upwardly and away from said belt, to afford access to the edges of said belt for cleaning the entire width of said belt, when said belt is not in operation.

References Cited in the file of this patent
UNITED STATES PATENTS

| | | |
|---|---|---|
| 405,994 | Espenschied | June 25, 1889 |
| 625,947 | Berquist | May 30, 1899 |
| 679,573 | Potter | July 30, 1901 |
| 778,191 | Hall | Dec. 20, 1904 |
| 1,707,206 | Bernert | Mar. 26, 1929 |
| 1,752,549 | Beardsley et al. | Apr. 1, 1930 |
| 2,116,603 | Holly | May 10, 1938 |
| 2,345,328 | Conway | Mar. 28, 1944 |
| 2,475,590 | Carbert | July 12, 1949 |
| 2,587,854 | Johnson | Mar. 4, 1952 |
| 2,650,693 | King | Sept. 1, 1953 |
| 2,743,965 | Mattson | May 1, 1956 |

FOREIGN PATENTS

| | | |
|---|---|---|
| 147,298 | Great Britain | July 22, 1920 |
| 415,921 | Germany | July 3, 1925 |